Oct. 4, 1966     W. OLANDER     3,276,786
NESTABLE SHOPPING CART

Filed April 6, 1964     2 Sheets-Sheet 1

INVENTOR.
WARD OLANDER
BY George Raynovich Jr
HIS ATTORNEY

Oct. 4, 1966  W. OLANDER  3,276,786
NESTABLE SHOPPING CART

Filed April 6, 1964  2 Sheets-Sheet 2

INVENTOR.
WARD OLANDER
BY
HIS ATTORNEY

United States Patent Office 3,276,786
Patented Oct. 4, 1966

3,276,786
NESTABLE SHOPPING CART
Ward Olander, 4921 Coleridge St., Pittsburgh, Pa.
Filed Apr. 6, 1964, Ser. No. 357,710
4 Claims. (Cl. 280—33.99)

The present invention relates to an improved shopping cart and, more particularly, to a light-weight, easily fabricated, stackable cart for carrying irregularly shaped bundles, to be utilized in modern merchandising methods.

In modern merchandising, many items, primarily groceries, are sold on a self-service arrangement whereby the customer walks among a displayed stock of goods and selects items that he wishes to purchase. After selecting the items, he later has the items accounted for and pays for his purchases all at one time. In this supermarket style of purchasing, the market owner often provides shopping carts to aid the customer in selecting and transporting his purchases to the checkout counter.

It is further the practice in many supermarkets, particularly in grocery supermarkets, for the purchaser to check out and pay for his purchases, to thereafter have the purchases loaded into paper sacks, and for the purchaser to then place the paper sacks back into the shopping cart and transport the purchases to an automobile in a parking lot adjacent to supermarket.

In the use of supermarket shopping carts to transport bundled purchases from the store to the automobile, a great loss to the merchant is often suffered by the disappearance or destruction of the supermarket cart. Many of the carts are carried off by dishonest purchasers. Many of the carts are left in places where they are subsequently damaged by automobiles entering the parking lot and are thereby rendered useless, and many of the carts are damaged by exposure to weather, ice and snow, or the like, when transported outdoors.

The conventional supermarket cart is a relatively expensive metal cart, usually having a heavy wire basket or baskets formed thereon, and is a rigid structure. The carts are specially designed so that they may stack one into the other when in storage to conserve space within the supermarket. The present invention is directed to an improved marketing cart which would be utilized to carry irregularly shaped bundles from a supermarket or the like to a parking area or the customer's home in order to inhibit the great financial loss to markets through the use of conventional marketing carts for these purposes.

The cart of the present invention is a light-weight cart made of inexpensive materials which may be considered, by the market owner, as a semi-expendable item. The cart of the present invention can be made available to supermarket owner for approximately ten to fifteen percent of the cost of the conventional, heavy wire body marketing cart. The cart of the present invention would primarily be utilized in carrying packages from within the market to the customer's automobile, the parking area, or wherever the customer wishes to transport the bundles.

In a supermarket equipped with the carts of the present invention, barriers would be provided to prevent the conventional heavy wire basket marketing carts from being taken out of doors. Supplies of the cart of the present invention would be made available to the customer for loading the bagged purchased items and transporting the items to the waiting automobile.

Further, in many types of non-grocery supermarket and department store shopping areas, the carts of the present invention could be provided to aid customers without requiring the expensive outlay in funds which would be required to equip those areas with conventional wire basket type supermarket carts. For example, in dry goods, hardware, clothing, and department stores, the carts of the present invention could be provided for customer convenience at a very small outlay to the merchant.

In order to successfully utilize a separate outdoor cart in supermarkets, the cart of the present invention has been carefully designed and arranged to provide a light-weight, dependable, stackable structure which can be easily repaired by the merchant and which can give long life at a very low initial outlay to the merchant. The cart chassis of the present invention may be assembled completely without fasteners of any type except for two press-on hubs which hold the wheels onto the axles. Further, a flexible, transparent body is provided on the cart. A flexible body permits stacking of the carts one into another to conserve space within the market itself. Further, the flexible body permits the cart to accommodate to irregularly shaped bundles to thereby make efficient use of the carrying capacity of the cart.

By providing a transparent body portion, the person checking out the purchases at the supermarket is able to observe that the cart is empty when the bundles are first placed therein. It is also possible to print advertising material on the body itself, in which case the body is only partially transparent. Further, the flexible, transparent or partially transparent body is provided with a spreader to hold the body open for loading and to make loading of the cart an easy operation.

With the foregoing considerations in mind, it is an object of the present invention to provide an improved marketing cart.

Another object of the present invention is to provide a light-weight, easily fabricated, stackable cart for carrying irregularly shaped bundles.

Another object of the present invention is to provide an easily assembled marketing cart which can be assembled and repaired with a minimum of skill.

Another object of the present invention is to provide a marketing cart which can be supplied to merchants at ten to fifteen percent of the cost of conventional wire body type marketing carts.

These and other objects of this invention will become apparent as this description proceeds in conjunction with the accompanying drawings.

Figure 1:
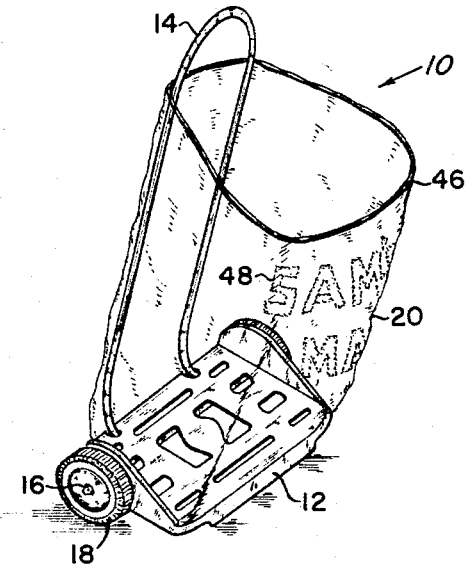
FIGURE 1 is a perspective view of the cart of the present invention.

Referring to the drawings, and particularly to FIGURE 1, the cart 10 includes the rigid base member 12, a handle member 14, an axle member 16, wheels 18, and a flexible body 20. These elements are assembled in a novel manner to provide the cart of the present invention.

Figure 6:
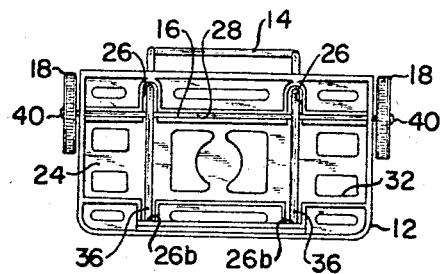
FIGURE 6 is a bottom plan view of the cart of the present invention.
Figure 4:
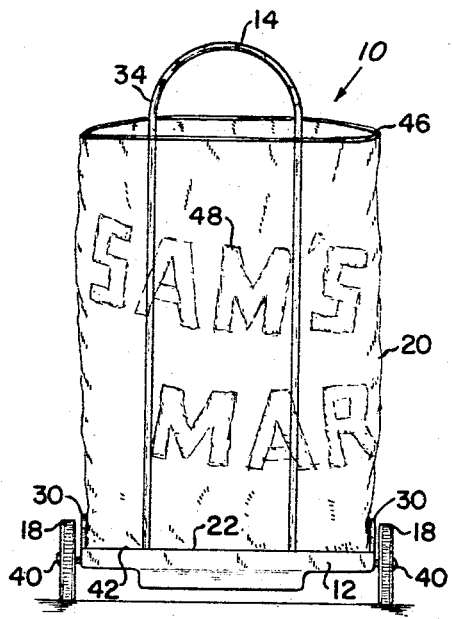
FIGURE 4 is a front elevation of the cart of the present invention.

Referring to FIGURES 3, 4, 5 and 6, it may be seen that the base member 12 has a relatively smooth upper or top surface 22 and a ridged or convoluted lower or under surface 24. As best shown in FIGURE 6, the ridged under surface 24 of base member 12 has handle receiving passages 26 formed therein by the position of the ridges.

Figure 5:
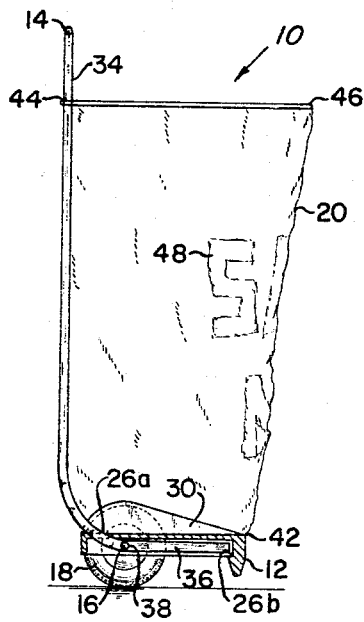
FIGURE 5 is a side elevation, in partial section, of the cart of the present invention with the partial section taken along line 5—5 of FIGURE 3.

The handle receiving passages 26 extend in parallel relation to each other and are equal distances inboard from the ends of the generally rectangular base member 12. At the rear end of the base member 12, the handle receiving passages 26 communicate with the upper surface 22 of the base member by means of portions 26a of the passages 26. The passage portions 26a are best shown in FIGURE 5. At the forward end of the passages 26, the passages are hooded as shown at 26b so that the passages 26 may receive the handles in a manner to be hereinafter described.

Also formed in the bottom surface of the base member 12 is an axle receiving passage 28 which extends transversally to the handle receiving passages 26 and which communicates with the handle receiving passages 26. The axle receiving passage 28 extends from one end of the base member to the other so that the axle can extend completely through the base member.

Formed on the upper surface 22 of base member 12 are protective wheel skirts 30 which are formed adjacent to the portion of the base member where the wheels 18 will be mounted on the axle member 16. The protective wheel skirts 30 prevent the flexible body 20 from coming into contact with the wheels to thereby extend the life of the body 20 and the wheels 18. The protective wheel skirts 30 are preferably formed integrally with the base member 12.

The base member 12 has openings 32 formed therein to reduce the weight of the base member and also to permit small items of trash or debris which may accumulate in the cart during use to fall through the holes 32 thereby keeping the inside of the cart relatively clean in use.

The base member of the present cart is preferably formed by injection molding a thermosetting plastic, which is light-weight and rigid, to the required shape. Although the base member could be made of other materials, for maximum effectiveness of the present invention, it should be a light-weight plastic material.

The handle member 14 of the present invention is formed from a single length of light-weight tubing, preferably a light-weight metal tubing, although a light-weight plastic tubing may also be utilized. The handle member is formed into a generally U-shaped portion 34 which lies in a single plane. The ends of the handle portion are bent out of the single plane so that the end portions 36 extend away from the U-shaped portion 34 in a plane which is generally perpendicular to the plane of the U-shaped portion. This relation is best seen in FIGURE 5.

The end portions 36 of handle member 14 each have a hole 38 bored therein. The hole 38 is so located that when the handle member 14 is positioned within the base member 12 as shown in FIGURE 5, the holes 38 are axially aligned with the axis of the axle receiving passage 28 of base member 12.

In assembling the cart of the present invention, the handle member end portions 36 are inserted through the portions 26a of handle receiving passages 26 and are then guided through handle receiving passages 26 until the ends of the handle end portions 36 are received into the hooded portion 26b of the handle receiving passages 26. With the handle so positioned relative to the base member 12, the elongated, cylindrical axle member 16 is inserted from one end to the other through the axle receiving passage 28 of base member 12 and through the holes 38 formed in handle end portions 36.

After the axle member 16 is in position, the wheels 18 are placed upon the protruding ends of the axle member. The wheels 18 are preferably formed of a light-weight, rigid plastic material which also tends to make the wheels self-lubricating. After the wheels are placed over the protruding axle ends, press-on hub members 40 are pressed onto the ends of the axle member 16 to retain the wheels in position and to retain the cart chassis in an assembled position. The axle member 16 serves to interlock the handle member 14 to the base member 12 without other fasteners.

The flexible bundle-retaining body 20 of the cart of the present invention is preferably formed of a length of flexible, transparent, polyethylene tubing of large diameter. This tubing is slipped down over the handle member 14 until the end of the tubing contacts the cart base member 12. The tubing is then secured at 42 to the base member 12 and is secured to the handle member 14 at 44. The body 20 is preferably secured adhesively to the base member 12 and handle member 14 by pieces of pressure sensitive tape.

The cart 20 has a spreader member 46 fixed thereto at the top portion of the body. The spreader member 46 is a semi-rigid bead of plastic and serves to lend some horizontal rigidity to the top of the body and also, as best seen in FIGURE 1, provides a resilience to the top of the body 20 which will tend to snap the body 20 open when the cart 10 is at its normal, at rest position.

The flexible, bundle-retaining body 20 has no rigid vertical support other than the handle member 14 to which it is attached at 44. The body 20 can be adhesively attached at 42 and 44 by either a bonding resin or by small strips of tape material. As may be seen in FIGURES 1, 4 and 5, the body 20 can be imprinted with advertising material as at 48.

Figure 2:
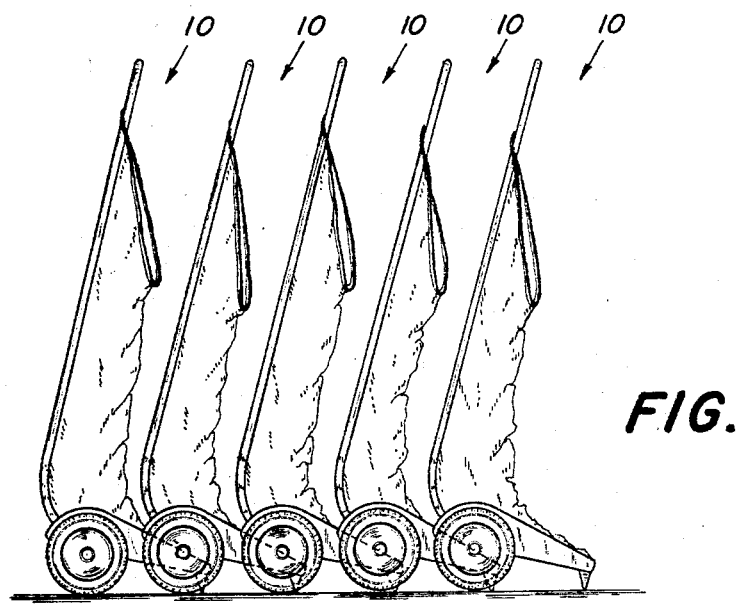
FIGURE 2 is a side elevation of five carts of the present invention in a stacked relationship to each other.
Figure 3:
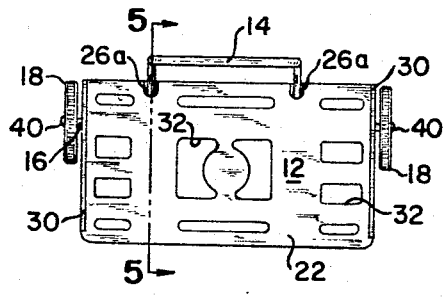
FIGURE 3 is a top plan view of the cart chassis of the present invention with the flexible body removed.

FIGURES 1 and 2 best show the cart 10 in its normal, at rest position. In this position, the front end of the base member 12 contacts the floor and, consequently, the handle member 14 tilts forward at a small angle. The center of gravity of the cart is such that it assumes this position when placed on the floor.

As best seen in FIGURE 2, the front end of the base member of one cart will fit under the axle of a second identical cart so that the carts may be stacked as shown in FIGURE 2. The wheels 18 of the cart are well outboard of the base member so that the front end of one base member can fit between the wheels of a second identical cart to permit stacking. As previously stated, the flexible body 20 can be deformed as shown in FIGURE 2 to permit stacking of the carts one into the other.

According to the provisions of the patent statutes, I have explained the principle, preferred construction and mode of operation of my invention and have illustrated and described what I now consider to represent its best embodiment. However, I desire to have it understood that, within the scope of the appended claims, the invention may be practiced otherwise than as specifically illustrated and described.

I claim:

1. A light-weight, easily fabricated, stackable, cart for carrying irregularly shaped bundles comprising:
    (a) a rigid base member having passages formed therein to receive a handle member and an axle member;
    (b) a handle member formed of a single piece of tubing and having end portions disposed within certain of said base member passages;
    (c) an elongated cylindrical axle member extending through certain of said base member passages and interlocking said handle member to said base member without the use of other fastening means;
    (d) a wheel rotatably positioned on each end of said axle member outboard of said base member; and
    (e) a flexible bundle-retaining body secured to said base member and said handle member, said body having no rigid vertical support other than said handle member and having a spreader fixed to the top of said flexible body, said flexible body being deformable to conform to said irregularly shaped bundles and being deformable to permit stacking of a plurality of said carts, said flexible body being formed from a length of transparent flexible, large diameter tubing and being imprinted with advertising material over at least a portion of its surface.

2. A light-weight, easily fabricated, stackable, cart for carrying irregularly shaped bundles comprising:
    (a) a generally flat, rigid, base member formed from a thermosetting plastic material, said base member having handle receiving passages formed therein to receive a handle member and having an axle receiving passage formed therein extending transversally to, and intersecting with, said handle receiving passages, said base member having protective wheel skirts formed thereon and extending in generally perpendicular relation to said axle receiving passage;

(b) a handle member formed of a single piece of light-weight tubing bent into a generally U-shaped position disposed in a single plane and having end portions extending in a plane generally perpendicular to the plane of said U-shaped portion, said handle member end portions each having a hole therethrough so located that when said handle end portions are positioned within said base member handle receiving passages, said holes are coincident with said base member axle receiving passage;

(c) an elongated cylindrical axle member extending through said base member axle receiving passage and through said holes in said handle end portions to interlock said handle member to said base member without the use of any other fastening means;

(d) a wheel formed of a rigid, light-weight plastic material rotatably positioned on each end of said axle member outboard of said base member and in proximity to each of said protective wheel skirts;

(e) a snap-on hub member secured to each end of said axle member to axially retain said wheels on said axle member and to axially retain said axle member within said base member; and (f) a flexible bundle-retaining body formed from a length of flexible plastic tubing, said body being adhesively secured to said base member and said handle member, said body having no rigid vertical support other than said handle member and having a spreader fixed to the top of said flexible body, said flexible body being deformable to conform to said irregularly shaped bundles and being deformable to permit stacking of a plurality of said carts.

3. A light-weight, easily fabricated, stackable, cart for carrying irregularly shaped bundles comprising:

(a) a generally flat, rigid, base member formed from a thermosetting plastic material, said base member having handle receiving passages formed thereon to receive a handle member and having an axle receiving passage formed therein extending transversally to, and intersecting with, said handle receiving passages said base member having protective wheel skirts formed thereon and extending in generally perpendicular relation to said axle receiving passage;

(b) a handle member formed of a single piece of light-weight tubing bent into a generally U-shaped portion disposed in a single plane and having end portions extending in a plane generally perpendicular to the plane of said U-shaped portion, said handle member end portions each having a hole therethrough so located that when said handle end portions are positioned within said base member handle receiving passages, said holes are coincident with said base member axle receiving passage;

(c) an elongated cylindrical axle member extending through said base member axle receiving passage and through said holes in said handle end portions to interlock said handle member to said base member without the use of any other fastening means, said axle member extending outwardly beyond the ends of said base member;

(d) a wheel formed of a rigid, light-weight plastic material rotatably positioned on each end of said axle member outboard of said base member and in proximity to each of said protective wheel skirts, said wheels being of such diameter that said axle member is raised above the ground a sufficient height for the end of a base member of an identical cart to be positioned between said axle member and the ground;

(e) a snap-on hub member secured to each end of said axle member to axially retain said wheels on said axle member and to axially retain said axle member within said base member; and (f) a flexible bundle-retaining member formed from a length of plastic tubing, said body being adhesively secured to said base member and said handle member, said body having no rigid vertical support other than said handle member and having a spreader fixed to the top of said flexible body, said flexible body being at least partially transparent, said flexible body being deformable to conform to said irregularly shaped bundles and being deformable to permit stacking of a plurality of said carts.

4. A light-weight, easily fabricated, stackable, cart for carrying irregularly shaped bundles comprising:

(a) a rigid base member;

(b) a handle member;

(c) an elongated cylindrical axle member constructed and arranged to interlock said handle member to said base member without the use of other fastening means;

(d) a wheel rotatably positioned on each end of said axle member outboard of said base member; and (e) a flexible bundle-retaining body secured to said base member and said handle member, said body having no rigid vertical support other than said handle member and having a spreader fixed to the top of said flexible body, said flexible body being formed from a flexible light-weight, transparent plastic material which is partially imprinted with advertising material, said body being deformable to conform to said irregularly shaped bundles and being deformable to permit stacking of a plurality of said carts.

References Cited by the Examiner

UNITED STATES PATENTS

| | | | |
|---|---|---|---|
| 1,751,902 | 3/1930 | Brown | 280—47.26 |
| 2,780,476 | 2/1957 | Upchurch | 280—47.25 |
| 2,868,557 | 1/1959 | Klipp et al. | |
| 2,962,292 | 11/1960 | Edmonston | 280—33.99 |
| 3,075,662 | 1/1963 | Da Prato et al. | 280—47.27 |
| 3,087,740 | 4/1963 | Mitty et al. | 280—47.26 |
| 3,109,667 | 11/1963 | Wolner | 280—47.34 |

BENJAMIN HERSH, *Primary Examiner.*

MILTON L. SMITH, *Examiner.*